US009527115B2

(12) United States Patent
LaRose et al.

(10) Patent No.: US 9,527,115 B2
(45) Date of Patent: Dec. 27, 2016

(54) COMPUTER VISION AND MACHINE LEARNING SOFTWARE FOR GRADING AND SORTING PLANTS

(75) Inventors: David Arthur LaRose, Pittsburgh, PA (US); Christopher Chandler Fromme, Sycamore, PA (US); David Jonathan Stager, Pittsburgh, PA (US); Michael Knoll Sergi-Curfman, Pittsburgh, PA (US); James Andrew Bagnell, Pittsburgh, PA (US); Elliot Allen Cuzzillo, Pittsburgh, PA (US); L. Douglas Baker, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 307 days.

(21) Appl. No.: 13/634,086

(22) PCT Filed: Mar. 14, 2011

(86) PCT No.: PCT/US2011/000465
§ 371 (c)(1),
(2), (4) Date: Oct. 22, 2012

(87) PCT Pub. No.: WO2011/115666
PCT Pub. Date: Sep. 22, 2011

(65) Prior Publication Data

US 2013/0028487 A1 Jan. 31, 2013

Related U.S. Application Data

(60) Provisional application No. 61/340,091, filed on Mar. 13, 2010.

(51) Int. Cl.
*G06K 9/00* (2006.01)
*B07C 5/342* (2006.01)

(52) U.S. Cl.
CPC .................................... *B07C 5/342* (2013.01)

(58) Field of Classification Search
CPC .................. B07C 5/342; G06T 7/0081; G06T 2207/20144; G06T 7/408; G06T 7/0083; H04N 1/56; H04N 1/4092; B44D 3/04; G06K 9/00523; G06K 9/46; G06K 9/4652; G06K 9/6292; G06F 17/30259; G06F 17/30256; G06F 17/3025
See application file for complete search history.

(56) References Cited

U.S. PATENT DOCUMENTS 5,253,302 A * 10/1993 Massen .................... B07C 5/10 348/47
5,864,984 A 2/1999 McNertney
(Continued)

FOREIGN PATENT DOCUMENTS

EP 0353800 A2 2/1990
EP 0353800 A3 2/1990
(Continued)

OTHER PUBLICATIONS

International Preliminary Report on Patentability and Written Opinion of the ISA for PCT Applicaiton No. PCT/US2011/00465 dated Sep. 18, 2012.
(Continued)

*Primary Examiner* — Amara Abdi
(74) *Attorney, Agent, or Firm* — David G. Oberdick; Michael G. Monyok

(57) ABSTRACT

The present invention encompasses software that brings together computer vision and machine learning algorithms that can evaluate and sort plants into desired categories. While one embodiment of the present invention is directed toward strawberry plants, the software engine described is not specifically designed for strawberry plants but can be used for many different types of plants that require sophis-
(Continued)

ticated quality sorting. The present invention is a sequence of software operations that can be applied to various crops (or other objects besides plants) in a re-usable fashion.

28 Claims, 14 Drawing Sheets

(56) References Cited

U.S. PATENT DOCUMENTS

| | | | | |
|---|---|---|---|---|
| 5,926,555 | A * | 7/1999 | Ort et al. | 382/124 |
| 6,882,740 | B1 | 4/2005 | McDonald, Jr. et al. | |
| 7,123,750 | B2 | 10/2006 | Lu et al. | |
| 7,218,775 | B2 | 5/2007 | Kokko et al. | |
| 7,367,155 | B2 | 5/2008 | Kotyk et al. | |
| 2003/0142852 | A1 | 7/2003 | Lu et al. | |
| 2005/0157926 | A1* | 7/2005 | Moravec | G06T 11/60 382/173 |
| 2005/0180627 | A1* | 8/2005 | Yang et al. | 382/159 |
| 2005/0192760 | A1 | 9/2005 | Dunlap | |
| 2007/0044445 | A1* | 3/2007 | Spicer | G01B 11/24 56/10.1 |
| 2007/0119518 | A1 | 5/2007 | Carman et al. | |
| 2008/0084508 | A1* | 4/2008 | Cole et al. | 348/744 |
| 2008/0166023 | A1* | 7/2008 | Wang | G06T 7/20 382/107 |
| 2009/0060330 | A1* | 3/2009 | Liu | 382/173 |
| 2010/0086215 | A1* | 4/2010 | Bartlett et al. | 382/197 |
| 2010/0254588 | A1* | 10/2010 | Cualing et al. | 382/133 |
| 2011/0175984 | A1* | 7/2011 | Tolstaya | G06K 9/38 348/46 |

FOREIGN PATENT DOCUMENTS

| | | | |
|---|---|---|---|
| EP | 1564542 | A1 | 8/2005 |
| JP | 08-190573 | A | 7/1996 |
| WO | 2004040274 | A1 | 5/2004 |

OTHER PUBLICATIONS

International Search Report and Written Opinion of the ISA for PCT Applicaiton No. PCT/US2011/00465 dated Oct. 31, 2011.

Davis, D.B. et al., "Machine Vision Development and Use in Seedling Quality Monitoring Inspection" In: Landis, T.D.; Cregg, B., tech. coords. National Proceedings, Forest and Conservation Nursery Associations. Gen. Tech. Rep. PNW-GTR-365. Portland, OR: U.S. Department of Agriculture, Forest Service, Pacific Northwest Research Station: 75-79. Available at: http://www.fcnanet.org/proceedings/1995/davis.pdf, 1995.

European Search Report for European Application No. 11756656.2 dated Jan. 28, 2014.

Pekkanen, Ville et al., Utilizing inkjet printing to fabricate electrical interconnections in a system-in-package, Microelectronic Engineering 87 (2010) 2382-2390, available online Apr. 22, 2010.

Smith, P.J. et al., Direct ink-jet printing and low temperature conversion of conductive silver patterns, Journal of Materials Science, 41 (2006) 4153-4158, published on web May 19, 2006.

Stringer, Jonathan et al., Formation and Stability of Lines Produced by Inkjet Printing, Langmuir 2010, 26 (12), 10365-10372, published on web Sep. 18, 2010.

Hossain, S.M. Zakir et al., Development of a Bioactive Paper Sensor for Detection of Neurotoxins Using Piezoelectric Inkjet Printing of Sol-Gel-Derived Bioinks, Anal. Chem. vol. 81, No. 13, Jul. 1, 2009, 5474-5483.

* cited by examiner

COMPUTER VISION AND MACHINE LEARNING SOFTWARE FOR GRADING AND SORTING PLANTS

CROSS-REFERENCE TO RELATED APPLICATIONS

This application is a U.S. National Stage Application under 35 USC 371 filing of International Application Number PCT/US2011/000465, entitled "COMPUTER VISION AND MACHINE LEARNING SOFTWARE FOR GRADING AND SORTING PLANTS" filed on Mar. 14, 2011, which is a Non-provisional Application of U.S. Provisional Application No. 61/340,091, titled COMPUTER VISION AND MACHINE LEARNING SOFTWARE FOR GRADING AND SORTING PLANTS, filed on Mar. 13, 2010, both are herein incorporated by reference.

BACKGROUND

The strawberry industry presently uses manual labor to sort several hundred million plants every year into good and bad categories, a tedious and costly step in the process of bringing fruit to market. Plants raised by nursery farms are cultivated in large fields grown like grass. The plants are harvested at night in the fall and winter when they are dormant and can be moved to their final locations for berry production. During the nursery farm harvest, the quality of the plants coming from the field is highly variable. Only about half of the harvested plants are of sufficient quality to be sold to the berry farms. It is these plants that ultimately yield the berries seen in supermarkets and road-side fruit stands. The present invention provides new sorting technologies that will fill a valuable role by standardizing plant quality and reducing the amount of time that plants are out of the ground between the nursery farms and berry farms.

Present operations to sort plants are done completely manually with hundreds of migrant workers. A typical farm employs 500-1000 laborers for a 6-8 week period each year during the plant harvest. The present invention is novel both in its application of advanced computer vision to the automated plant-sorting task, and in the specific design of the computer vision algorithms. One embodiment of the present invention applies to strawberry nursery farms. However, there are other embodiments of the software engine being for many different types of plants that require sophisticated quality sorting.

BRIEF SUMMARY OF THE INVENTION

The software described in the present invention is a core component for a system that can take plants from a transport bin, separate them into single streams, inspect, and move them into segregated bins that relate to sale quality. Although automated sorting systems exist in other applications, this is the first application to strawberry nursery sorting, and the first such system to involve extensive processing and computer vision for bare-root crops.

DETAILED DESCRIPTION

Figure 1:
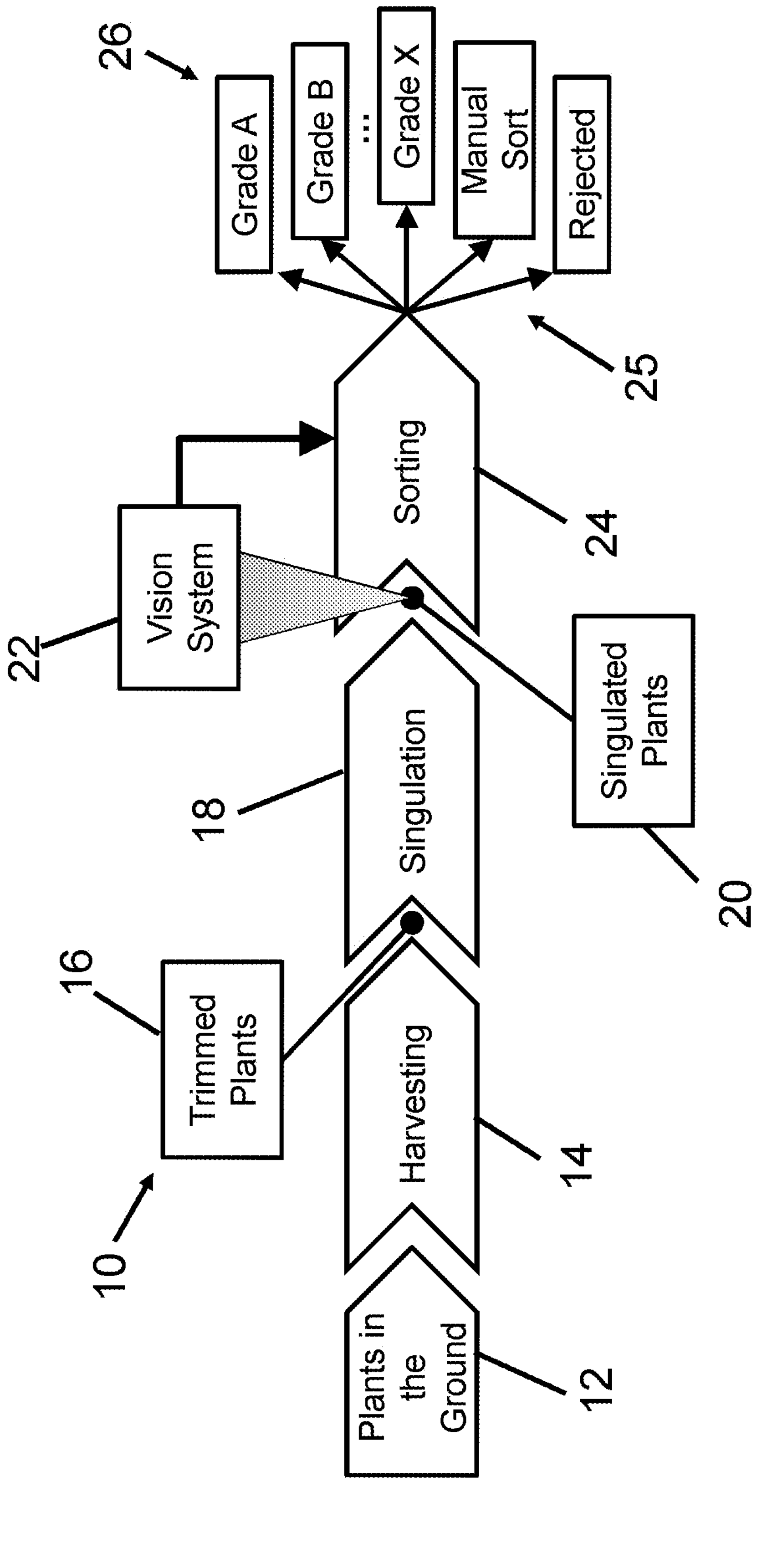
FIG. 1 is a flow diagram of the crop specification process steps of the present invention.
Figure 2:
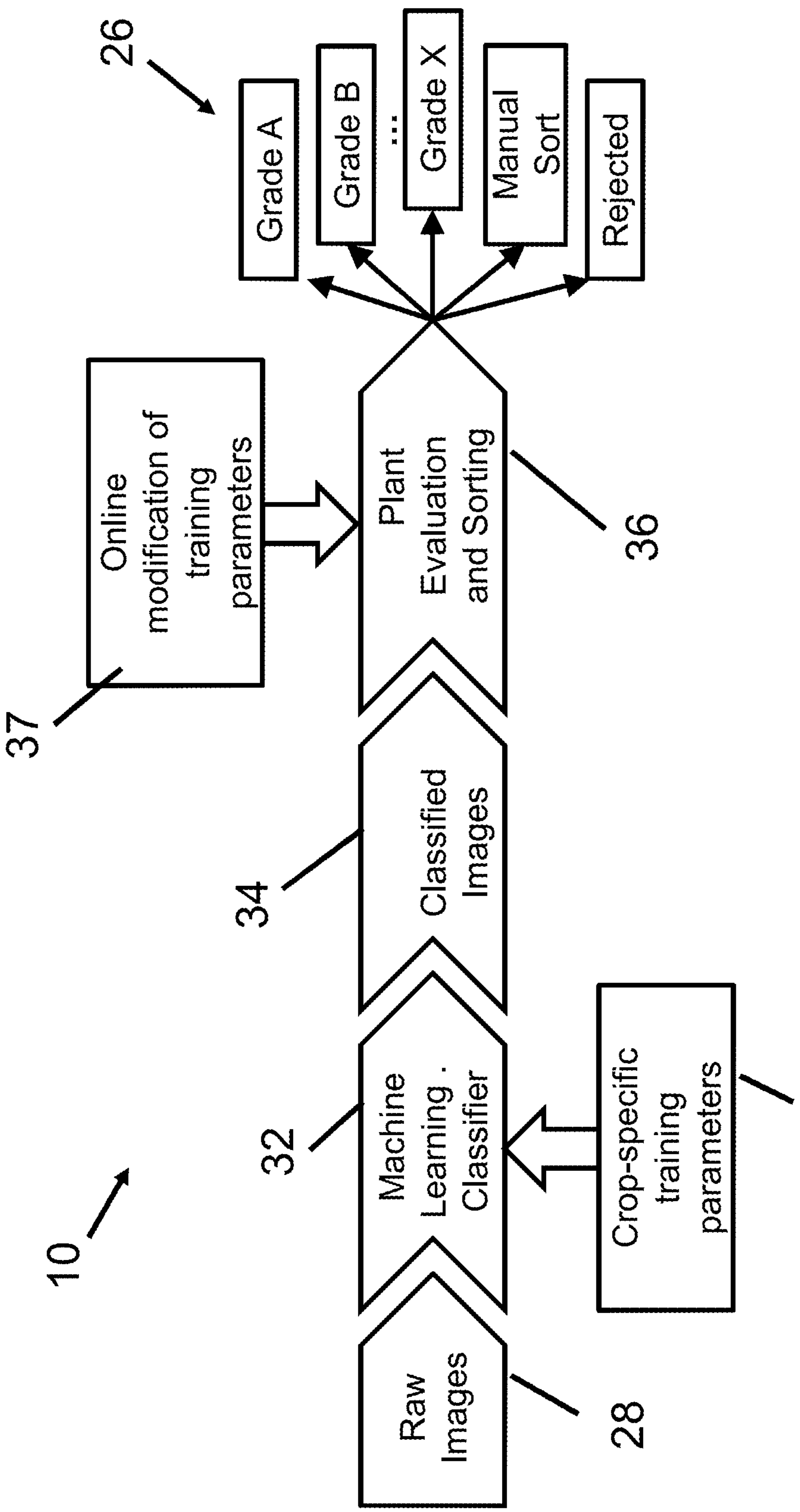
FIG. 2 is a flow diagram of the process steps of the present invention.

FIGS. 1 and 2 are flow chart illustrations of the system 10 of the present invention. As shown in FIG. 1, plants in the ground 12 are harvested 14 from the ground, roots trimmed and dirt removed for improved classification 16, plants are separated by a singulation process 18, each plant 20 is optically scanned by a vision system 22 for classification, and the plants 18 are sorted 24 based on classification grades, such as Grade A, Grade B, good, bad, premium, marginal, problem X, problem Y, and directed along a predetermined path 25 for disposition into bins by configured categories 26 or a downstream conveyor for: (i) shipment to customers, (ii) separated for manual sorting, or (iii) rejected. As shown in FIG. 2, optically scanned raw images 28 are classified using a bare-root plant machine learning classifier 32 to generate classified images based on crop specific training parameters 30. The classified images 34 undergo a crop specific plant evaluation and sorting process 36 that determines the grade of the plant and the disposition of each plant 26 configured categories.

Figure 3:
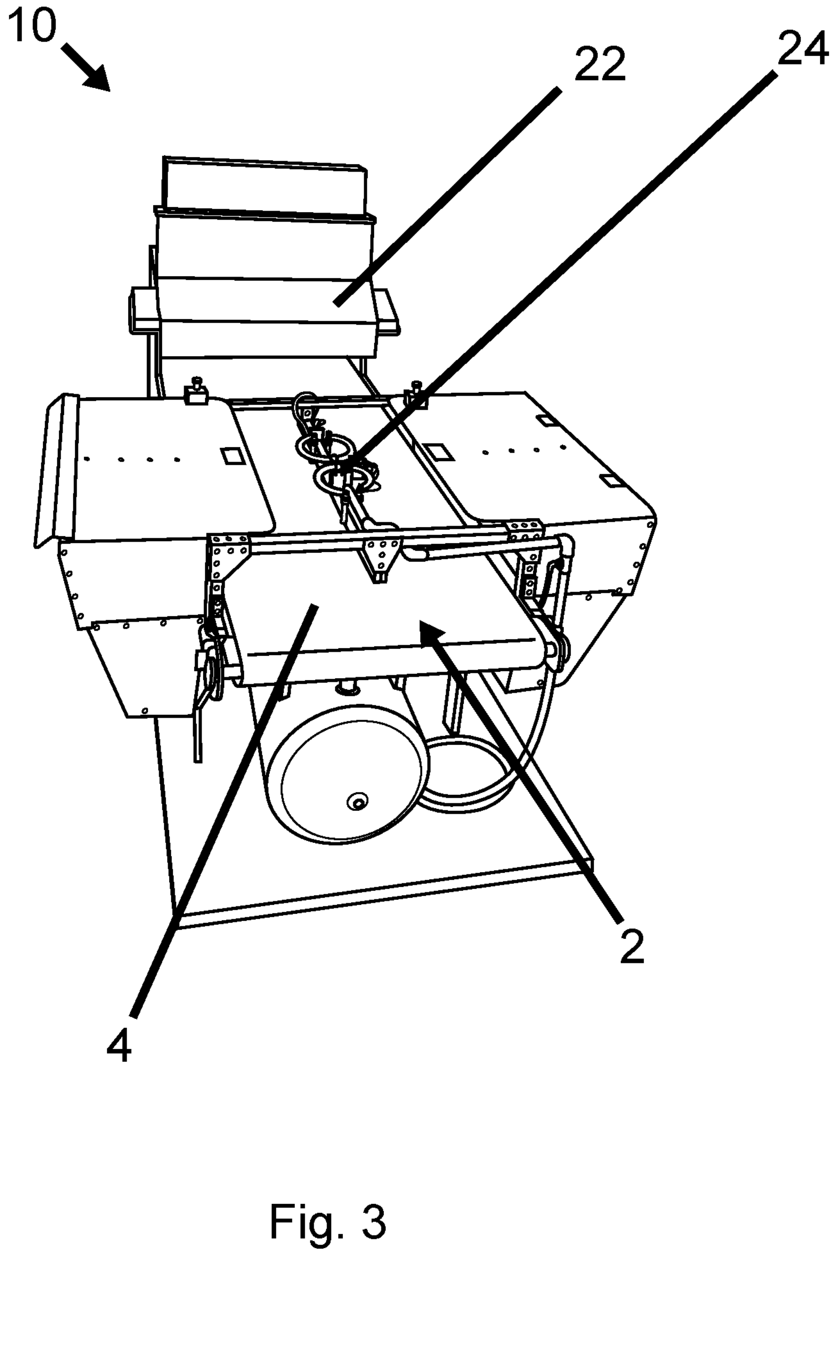
FIG. 3 is photograph showing an exemplary plant sorter for implementation with the software of the present invention.

FIG. 3 illustrates an exemplary system 10 having a conveyor system 2 with a top surface 4, a vision system 22, and a sorting device 24. An example of the sorting device is air jets in communication with the vision system for selective direction of the individual plants along the predetermined path.

This invention is a novel combination and sequence of computer vision and machine learning algorithms to perform a highly complex plant evaluation and sorting task. The described software performs with accuracy matching or exceeding human operations with speeds exceeding 100 times that of human sorters. The software is adaptable to changing crop conditions and until now, there have been no automated sorting systems that can compare to human quality and speed for bare-root plant sorting.

Figure 4:
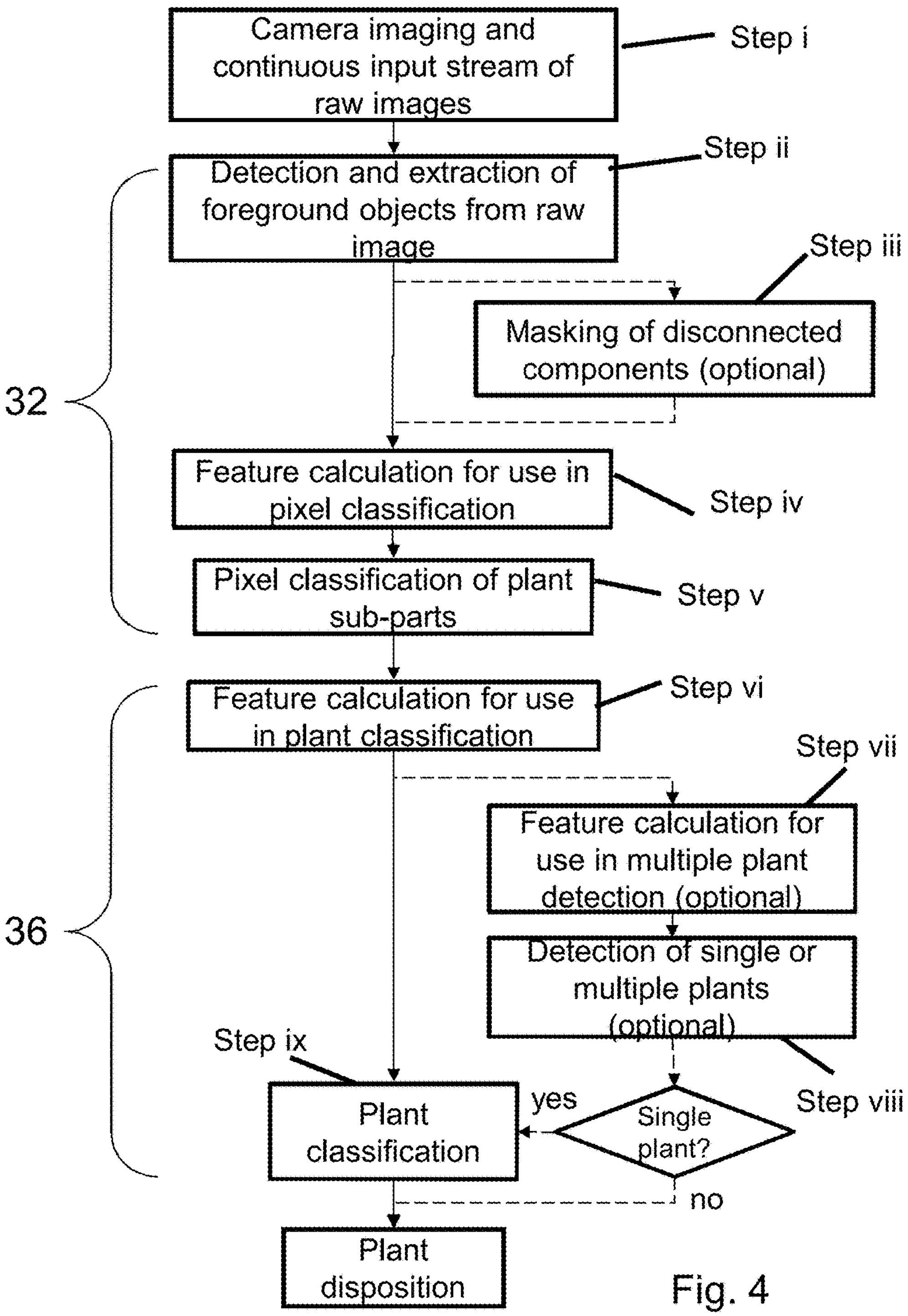
FIG. 4 is a flow chart of the real time software of the present invention.

FIG. 4 illustrates the software flow logic of the present invention broken into the following primary components: (i) camera imaging and continuous input stream of raw data, e.g., individual plants on a high speed conveyor belt or any surface, (ii) detection and extraction of foreground objects (or sub-images) from the raw imagery, (iii) masking of disconnected components in the foreground image, (iv) feature calculation for use in pixel classification, (v) pixel classification of plant sub-parts (roots, stems, leaves, etc.), (vi) feature calculation for use in plant classification, (vii) feature calculation for use in multiple plant detection, (viii) determination of single or multiple objects within the image, and (ix) plant classification into categories (good, bad, premium, marginal, problem X, problem Y, etc). Step i produces a real-time 2 dimensional digital image containing conveyor background and plants. Step ii processes the image stream of step i to produce properly cropped images containing only plants and minimal background. Step iii utilizes connected-component information from step ii to detect foreground pixels that are not part of the primary item of interest in the foreground image, resulting in a masked image to remove portions of other nearby plants that may be observed in this image. Step iv processes the plant images of step iii using many sub-algorithms and creates 'feature' images representing how each pixel responded to a particular computer vision algorithm or filter. Step v exercises a machine learning classifier applied to the feature images of step iv to predict type of each pixel (roots, stems, leaves, etc.). Step vi uses the pixel classification image from step v to calculate features of the plant. Step vii uses information from step v and step vi to calculate features used to discern whether an image contains a single or multiple plants. Step viii exercises a machine learning classifier applied to plant features from step vii to detect the presence of multiple, possibly overlapping, plants within the image. If the result is the presence of a single plant, step ix exercises a machine learning classifier applied to the plant features from step vi to calculate plant disposition (good, bad, marginal, etc).

FIG. 4 also illustrates the operational routines of bare-root plant machine learning classifier 32 and crop specific plant evaluation and sorting process 36. Bare-root plant machine learning classifier 32 can include step ii detecting and extracting foreground objects to identify a plurality of sub-parts of the bare-root plant to form a first cropped image; step iv calculating features for use in pixel classification based on the cropped image to classify each pixel of the cropped image as one sub-part of the plurality of sub-parts of the bare-root plant; and step v classifying pixels of the plurality of sub-parts of the bare-root plant to generate a vector of scores for each plant image. For improved accuracy, bare-root plant machine learning classifier 32 can also include step iii masking disconnected components of the first cropped image to form a second cropped image. Crop specific plant evaluation and sorting process 36 can include step vi calculating features for use in plant classification; and step ix classifying the bare-root plant based on the calculated features into a configured category. For detection of multiple plants, crop specific plant evaluation and sorting process 36 can also include step vii calculating features for use in multiple plant detection; and step viii detecting a single plant or multiple plants.

Figure 5:
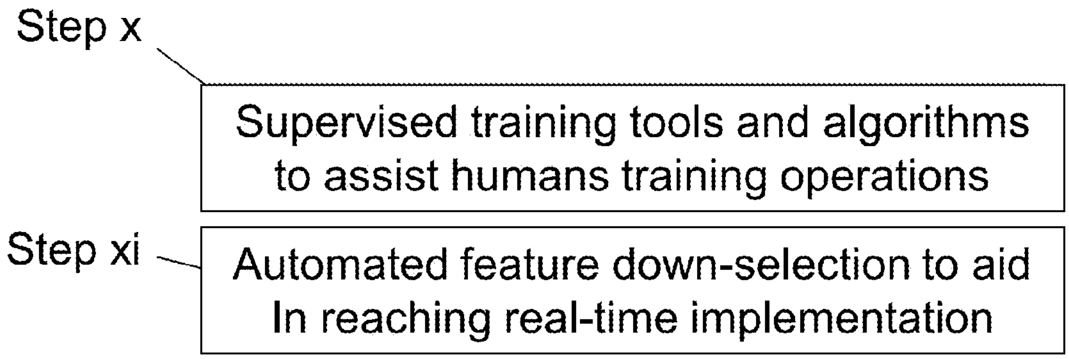
FIG. 5 is a flow chart of the offline software of the present invention.

FIG. 5 illustrates additional processing steps of the present invention that include (x) supervised training tools and algorithms to assist human training operations and (xi) automated feature down-selection to aid in reaching real-time implementations.

Specific details of each embodiment of the system as shown in FIG. 4 are described below One embodiment of system 10 of the present invention includes 2 dimensional camera images for classification. The imagery can be grayscale or color but color images add extra information to assist in higher accuracy pixel classification. No specific resolution is required for operation, and system performance degrades gracefully with decreasing image resolution. The image resolution that provides most effective classification of individual pixels and overall plants depends on the application.

One embodiment of the present invention that generates the 2 dimensional camera images (step i of FIG. 4) can include two types of cameras: area cameras (cameras that image rectangular regions), and line scan cameras (cameras that image a single line only, commonly used with conveyor belts and other industrial applications). The camera imaging software must maintain continuous capture of the stream of plants (typically a conveyor belt or waterfall). The images must be evenly illuminated and must not distort the subject material, for example plants. For real-time requirements, the camera must keep up with application speed (for example, the conveyor belt speed). Exemplary system 10 requires capturing pictures of plants at rates of 15-20 images per second or more.

Figure 6A:
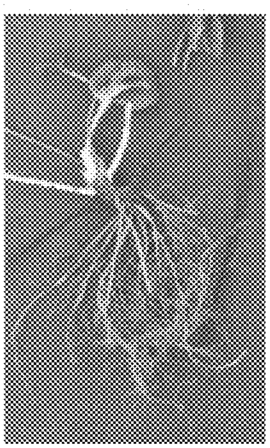
FIGS. 6A-F are images of the present invention illustrating the detection and extraction of foreground objects or sub-images from raw imagery.
Figure 6B:
Figure 6C:
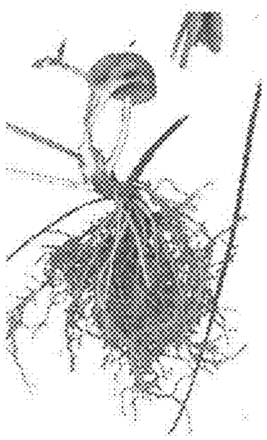
Figure 6D:
Figure 6E:
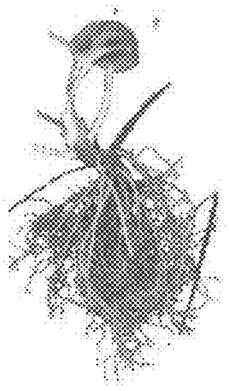
Figure 6F:
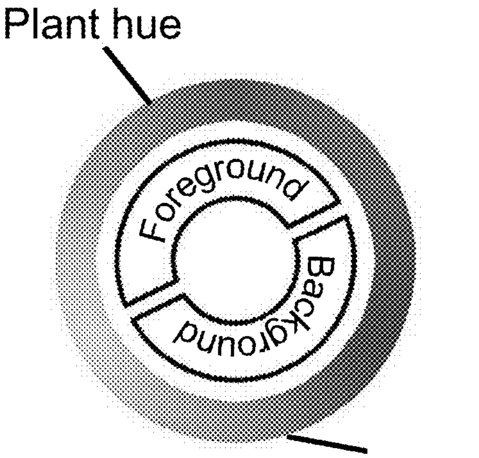

FIGS. 6A-F illustrates one aspect of the present invention that requires software for detection and extraction of foreground objects (or Sub-Images) from raw imagery (step ii of FIG. 4) of the 2 dimensional images created by the camera imaging software (step i of FIG. 4). One embodiment of the software can use a color masking algorithm to identify the foreground objects (plants). For a conveyor belt system, the belt color will be the background color in the image. A belt color is selected that is maximally different from the colors detected in the plants that are being inspected. The color space in which this foreground/background segmentation is performed is chosen to maximize segmentation accuracy. The maximally color differential method can be implemented with any background surface being either a stationary or moving surface. FIG. 6F illustrates that converting incoming color imagery to hue space and selecting a background color that is out of phase with the foreground color, a simple foreground/background mask (known as hue threshold or color segmentation FIG. 6F) can be applied to extract region of interest images for evaluation. FIGS. 6A-C show an example foreground detection and extraction. FIG. 6B segregates the foreground and background of FIG. 6A based on a hue threshold (FIG. 6F), and creates a mask. In FIG. 6B, white indicates the foreground mask and black indicates the background mask by color segmentation. FIG. 6C shows the mask applied to the original image (FIG. 6A), with only the color information of the foreground (i.e., the plant) displayed and the background is ignored.

The present invention can include two operational algorithms for determining region of interest for extraction:

A first algorithm can count foreground pixels for a $1^{st}$ axis per row. When the pixel count is higher than a threshold, the algorithm is tracking a plant. This threshold is pre-determined based on the size of the smallest plant to be detected for a given application. As the pixel count falls below the threshold, a plant is captured along one axis. For the $2^{nd}$ axis, the foreground pixels are summed per column starting at the column with the most foreground pixels and walking left and right until it falls below threshold (marking the edges of the plant). This algorithm is fast enough to keep up with real-time data and is good at chopping off extraneous runners and debris at the edges of the plant due to the pixel count thresholding. The result of this processing are images cropped around the region of interest with the background masked, as in FIG. 6C, that can use used directly as input to step iv or can be further processed by step iii to remove "blobs" or other images that are not part of the subject plant.

Step iii is a second algorithm that can use a modified connected components algorithm to track 'blobs' and count foreground pixel volume per blob during processing. Per line, the connected components algorithm is run joining foreground pixels with their adjacent neighbors into blobs with unique indices. When the algorithm determines that no more connectivity exists to a particular blob, that blob is tested for minimum size and extracted for plant classification. This threshold is pre-determined based on the size of the smallest plant to be detected for a given application. If the completed blob is below this threshold it is ignored, making this algorithm able to ignore dirt and small debris without requiring them to be fully processed by later stages of the system. The result of this processing are images cropped around the region of interest that encompasses each blob with the background masked, as in FIG. 6C, which can be used as input into step iv.

It is possible that the cropped image containing the region of interest may contain foreground pixels that are not part of the item of interest, possibly due to debris, dirt, or nearby plants that partially lie within this region. Pixels that are not part of this plant are masked and thus ignored by later processing, reducing the overall number of pixels that require processing and reducing errors that might otherwise be introduced by these pixels. FIG. 6D shows an example of a foreground mask in which extraneous components that were not part of the plant have been removed. Note that portions of the image, such as the leaf in the top right corner, are now ignored and marked as background for this image. The result of this stage is an isolated image containing an item of interest (i.e. a plant), with all other pixels masked (FIG. 6E). This stage is optional and helps to increase the accuracy of plant quality assessment.

One embodiment of the present invention includes an algorithm for feature calculation for use in pixel classification (step iv of FIG. 4) in order to classify each pixel of the image as root, stem, leaf, etc. This utilizes either the output of step ii or step iii, with examples shown in FIGS. 6C and 6E, respectively. The algorithm is capable of calculating several hundred features for each pixel. Though the invention is not to be limited to any particular set of features, the following features are examples of what can be utilized:

(i) Grayscale intensity;

(ii) Red, Green, Blue (RGB) color information;

(iii) Hue, Saturation, Value (HSV) color information;

(iv) YIQ color information;

(v) Edge information (grayscale, binary, eroded binary);

(vi) Root finder: the algorithm developed is a custom filter that looks for pixels with adjacent high and low intensity patterns that match those expected for roots (top and bottom at high, left and right are lower). The algorithm also intensifies scores where the root match occurs in linear groups; and (vii) FFT information: the algorithm developed uses a normal 2D fft but collapses the information into a spectrum analysis (1D vector) for each pixel block of the image. This calculates a frequency response for each pixel block which is very useful for differentiating texture in the image; gradient information; and Entropy of gradient information.

Figure 7A:
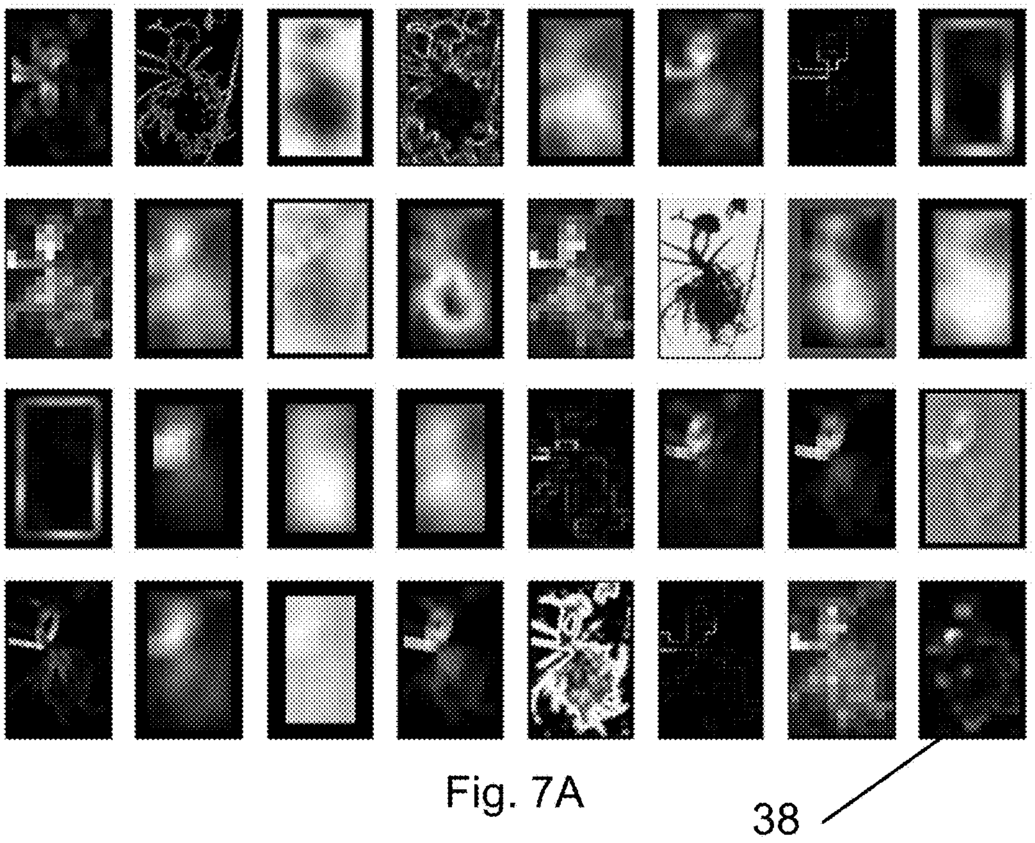
FIGS. 7A-B illustrate some of the typical features calculated for a strawberry plant by the present invention.
Figure 7B:
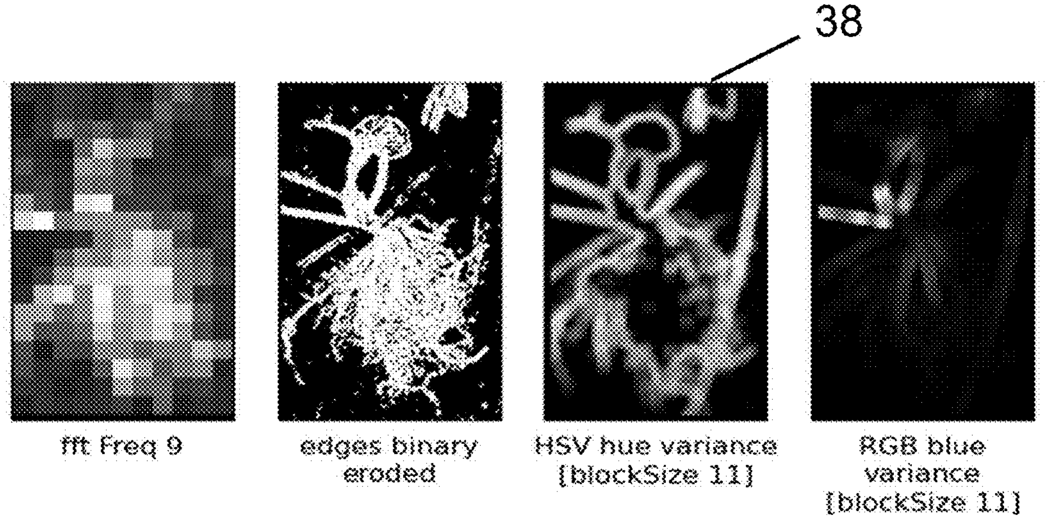

After the features are computed, the neighborhood mean is then calculated and variance for each pixel executed over many different neighborhood sizes as it was found that the accuracy of classifying a particular pixel can be improved by using information from the surrounding pixels. The neighborhood sizes used are dependent upon the parameters of the application, typically a function of plant size, plant characteristics, and camera parameters. FIGS. 7A-B represents some of the typical features 38 calculated for a strawberry plant. At the end of feature calculation each pixel has a vector of scores, with each score providing a value representing each feature.

The system is designed to be capable of generating several hundred scores per pixel to use for classification, but the configuration of features is dependent upon computational constraints and desired accuracy. The exemplary system 10 utilizes a set of 37 features that were a subset of the 308 tested features (element vectors). This subset was determined through a down-select process, explained in a later section, which determined the optimal and minimum combination of features to achieve desired minimum accuracy. This process can be performed for each plant variety as well as plant species.

Figure 8A:
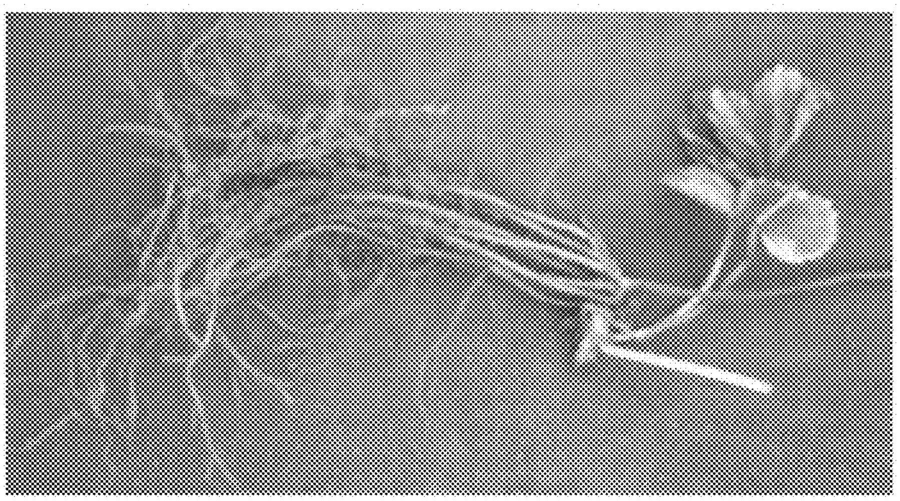
FIGS. 8A-B are images of the present invention showing background, roots, stems, live leaves and dead leaves being correctly identified.
Figure 8B:
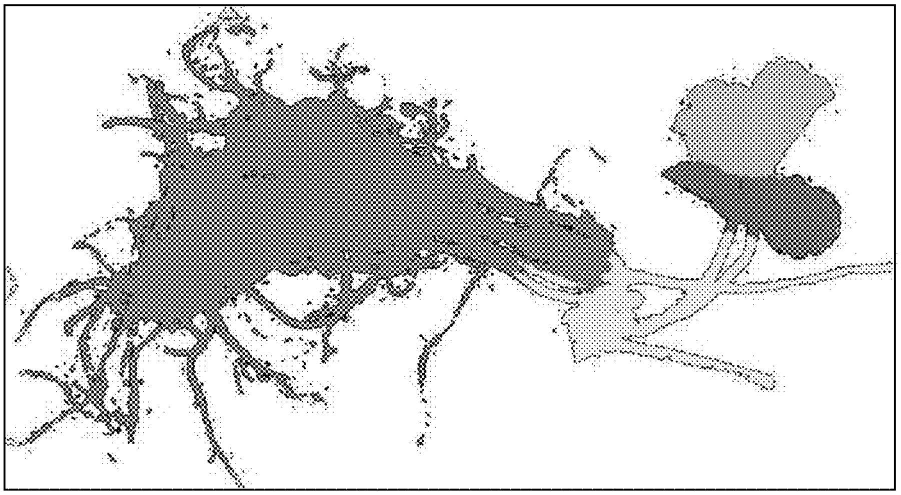

Machine learning techniques are used to classify pixels into high level groups (step v of FIG. 4) such as roots, stems, leaves, or other plant parts using calculated feature score vectors. For example, a SVM (support vector machine) classifier can be implemented for plant classification but other classifiers may be substituted as well. This implementation is generic and configurable so the software may be used to classify roots, stems, and leaves for one plant variety and flowers, fruits, stems, and roots for another variety. This step of the software requires training examples prior to classification when a new variety is used with the system. The training procedures allow the learning system to associate particular combinations of feature scores with particular classes. Details of this training process are explained later in this document. Once training is complete, the software is then able to automatically label pixels of new images. FIGS. 8A-B show background, roots, stems, live leaves, and dead leaves being correctly identified. FIG. 8A is a reference figure and FIG. 8B is the processed image of step v.

Another aspect of the present invention uses the classified pixel image (FIG. 8B of step v) discussed above for further feature calculation for use in plant classification (step vi of FIG. 4). The algorithm can calculate plant characteristics such as: overall plant size and size of each subcategory (root, stem, leaves, other), ratio of different subcategories (i.e. root vs. stem), mean and variance of each category pixel color (looking for defects), spatial distributions of each category or subcategory (physical layout of the plant), lengths of roots and stems, histogram of texture of roots (to help evaluate root health), location and size of crown, number of roots or overall root linear distance, and number of stems. These characteristics are computed using the pixel classification results. For example, the overall size of each plant sub-part category is estimated by a pixel count of those categories in the image relative to the overall image size. At the end of feature calculation, each plant image has a vector of scores that is used to further classify that plant image.

One particular algorithm that helps to standardize the plant classification application is the concept of virtual cropping. Even though different farmers chop their plants, such as strawberries, using different machinery, the plant evaluation of the present invention can be standardized by measuring attributes only within a fixed distance from the crown. This allows for some farmers to crop short while others crop longer, and makes the plant classification methods above more robust to these variations. This step is optional and can improve the consistency of classification between different farm products.

Figure 11:
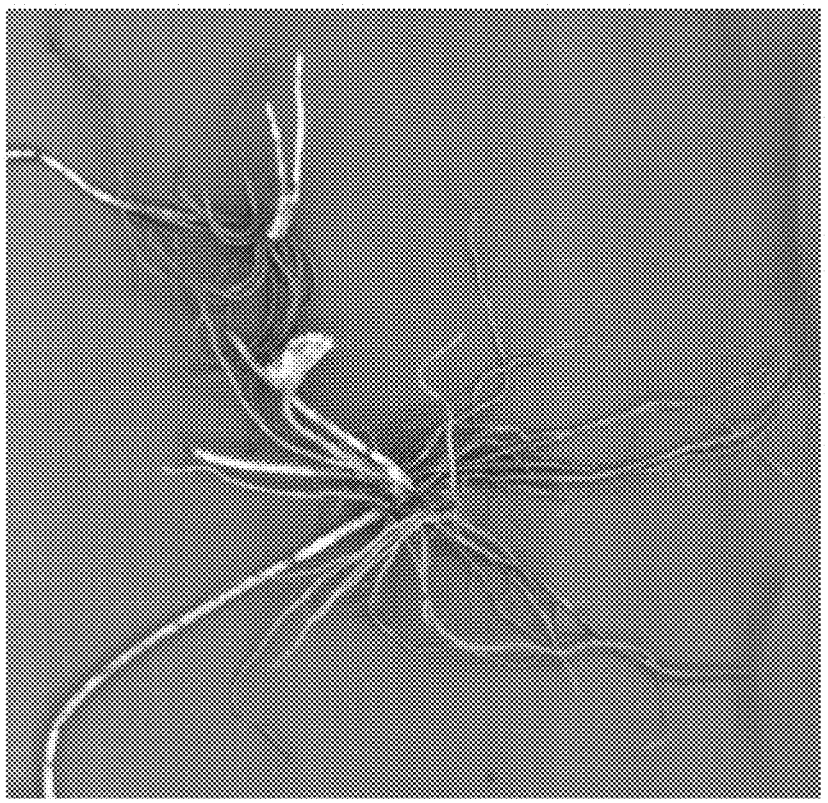
FIG. 11 is an image of multiple plants.

Depending on the technology utilized for plant singulation 18 (FIG. 1), it may be required for the system to determine if only a single plant is present in the image. This step is optional if singulation is reliable (i.e. if plants are adequately separated to create images of only single plants). Some applications of this plant evaluation software may involve mechanical devices that distribute plants onto the inspection surface for the camera, and may not achieve 100% separation of the plants. FIG. 11 shows a pair of overlapping plants in an image. In this instance, it may be desired to detect that multiple plants are present and handle them in a special manner. For example, a sorting system may place clumps of plants into a special bin for evaluation by some other means. The vector of plant scores calculated above are used for this purpose (step vi of FIG. 4), providing cues based on overall size, root mass, etc. Additionally statistics regarding the crown pixel distribution are used as features for classification (step vii of FIG. 4) to generate a vector of scores for multiple plant detection. An image with multiple crowns typically exhibits a multimodal distribution of pixel locations, thus statistics including kurtosis and variance of these pixel locations are calculated and used as additional features. These measures combine to give a strong indication of multiple crowns in the image without the need for an absolute crown position detector. Machine learning is applied to these score vectors so that the system is able to associate particular combinations of scores with the presence of single or multiple plants (step viii of FIG. 4). The breadth of features used is designed such that the system is capable of detecting multiple plants within images where some of the crowns are not visible, due to cues from other features. If multiple plants are detected, the plants are dispositioned in a predefined manner. Otherwise the vector of plant scores from step vi are used for final plant classification (step ix of FIG. 4).

Another aspect of the present invention mentioned above is plant classification (step ix of FIG. 4) into categories (good, bad, premium, marginal, problem X, problem Y, etc.). This algorithm of the software package uses machine learning to use the vector of plant scores from step vi to classify plant images into high level groups such as good and bad. Various embodiments of the present invention use SVM (support vector machine), clustering, and knn classifiers, but other classifiers are able to be used within the scope of the invention. The algorithm can be used to classify good vs. bad (2 categories) for one plant variety and no-roots, no-crown, too small, premium, marginal large, marginal small (6 categories) for another variety and is configured based on the present application. This step of the software requires training examples prior to classification, allowing the learning system to associate particular combinations of plant score vectors with particular classes. Details of this training process are explained later in this document. The result of this stage of the software during runtime operation is an overall classification for the plant based on the configured categories 26 (See FIG. 1). The plant will be dispositioned based on the classification and the configuration of the application. Exemplary system 10 ultimately classifies a plant as one that can or cannot be sold based on various health characteristics and dispositions the plant into an appropriate bin.

Another aspect of the present invention involves training procedures and tools for the system software (step x in FIG. 5). There are two separate training stages 32, 36 (FIG. 2) for the overall system. The first training stage 32 involves creating a mathematical model for classifying pixels can be utilized by step v of FIG. 4. Examples of two operational algorithms that perform that task are presented below.

Figure 9A:
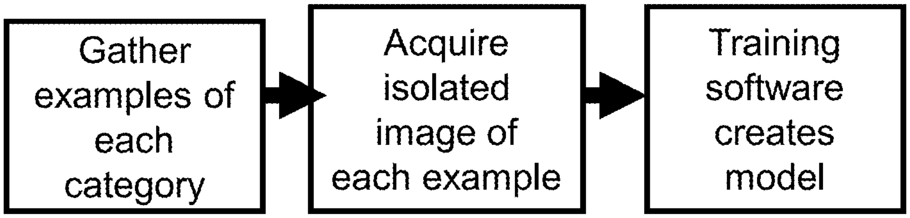
FIGS. 9A-B show flow diagrams of the process steps for training the pixel classification stage of the present invention.

The first algorithm, shown in FIG. 9A, includes the step to manually cut plants apart into their various sub-components (roots, leaves, stems, etc.) and capture images of each example. The foreground pixels from these images are then used as training examples with each image giving a set of examples for one specific class. The results from this method are good but sometimes overlapping regions of roots, stems, or leaves in full plant images are misclassified because they are not represented properly in the training.

Figure 9B:
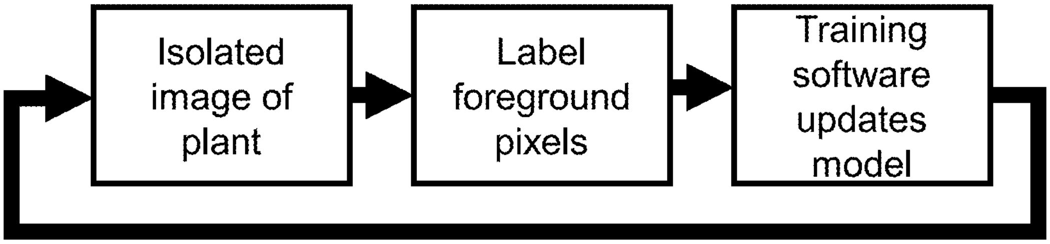
Figure 10A:
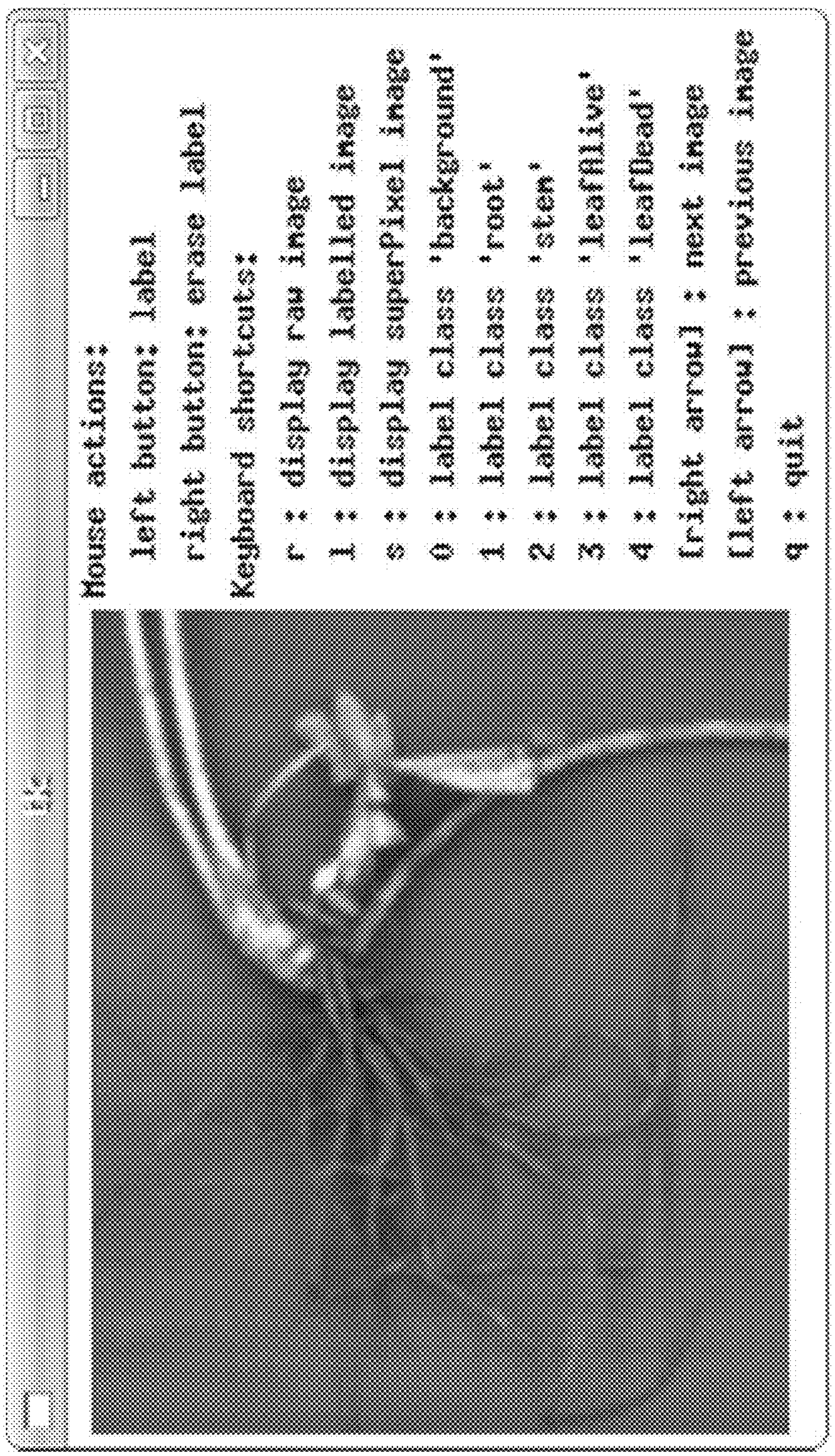
FIGS. 10A-C are images of the present invention illustrating other supervised training tools and algorithms to assist in human training operations.
Figure 10B:
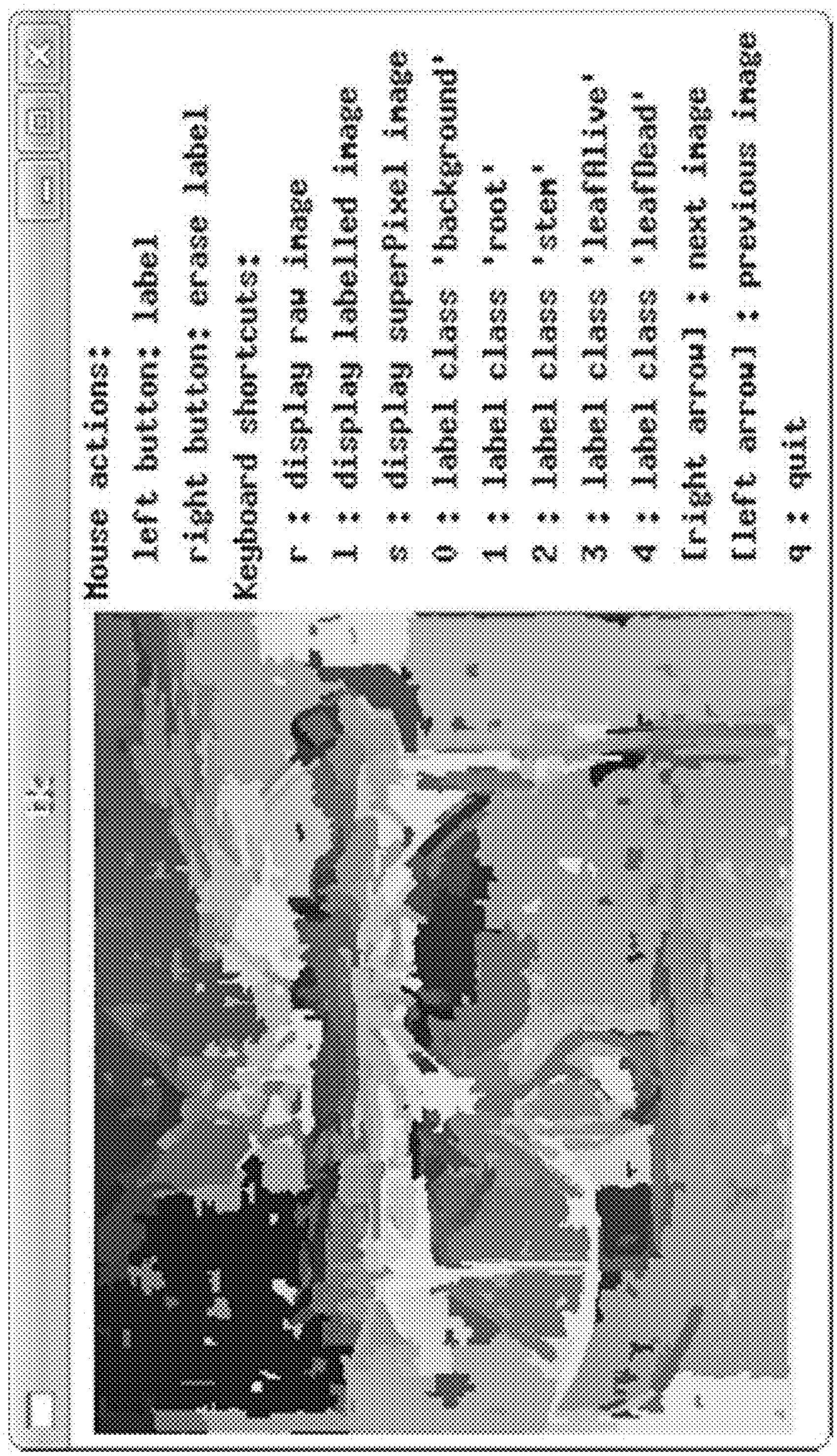
Figure 10C:
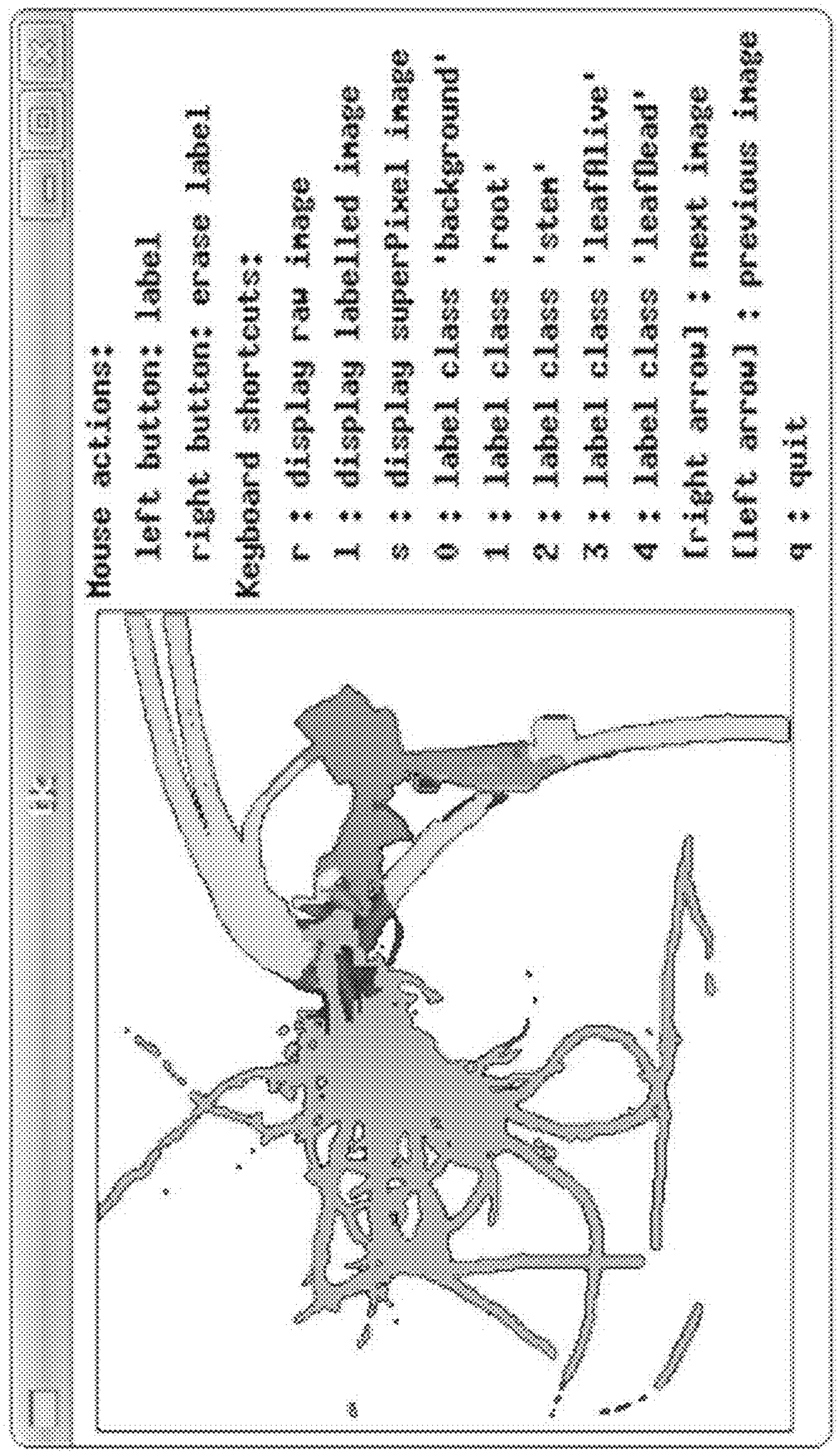

A second algorithm, shown in FIG. 9B, uses a selection of images containing full plants rather than specific plant parts. For example, 50 plant images can be collected and used for this purpose. These images are input to a custom training utility in order to label the foreground pixels with appropriate categories. This utility processes each image with a super-pixel algorithm customized for this application using intensity and hue space for segmentation. The image is then displayed in a utility for the operator to label pixels. This is labeling is accomplished by selecting a desired category then clicking on specific points of the image to associate with this label. Using the super-pixel results, nearby similar pixels are also assigned this label to expedite the process. Thus the operator only needs to label a subset of the foreground pixels to fully label an image. FIGS. 10A-C demonstrate the different stages of the training utility. FIG. 10A shows a cropped image displayed ready to be labeled. FIG. 10B displays an image showing the results of super-pixel segmentation, with each colored section representing a segmented portion of the image. FIG. 10C shows much of the image having been labeled by an operator.

The second algorithm is a more manually intensive method, but is able to achieve higher accuracy in some situations. When there are cases of overlapping regions of different classes, this method is better able to assess them correctly.

Once training images have been collected, machine learning software is applied to train a model for the classifier. This first training stage produces a model containing parameters used to classify each pixel into a configurable category, such as root, stem, leaf, etc.

The second training stage involves creating a model for classifying plants 36 (FIG. 2) can be utilized by step ix of FIG. 4. To achieve this, a collection of isolated plant images are acquired for training. The number of images required is dependent upon the machine learning method being applied for an application. Once these images are acquired they must be assigned a label based on the desired categories that are to be used for classification. Two methods have been utilized to acquire these labels.

The first method involves sorting plants manually. Once the plants are separated into the various categories, each plant from each category is captured and given a label. This is a time intensive task as the plants must be sorted manually, but allows careful visual inspection of each plant.

Figure 12:
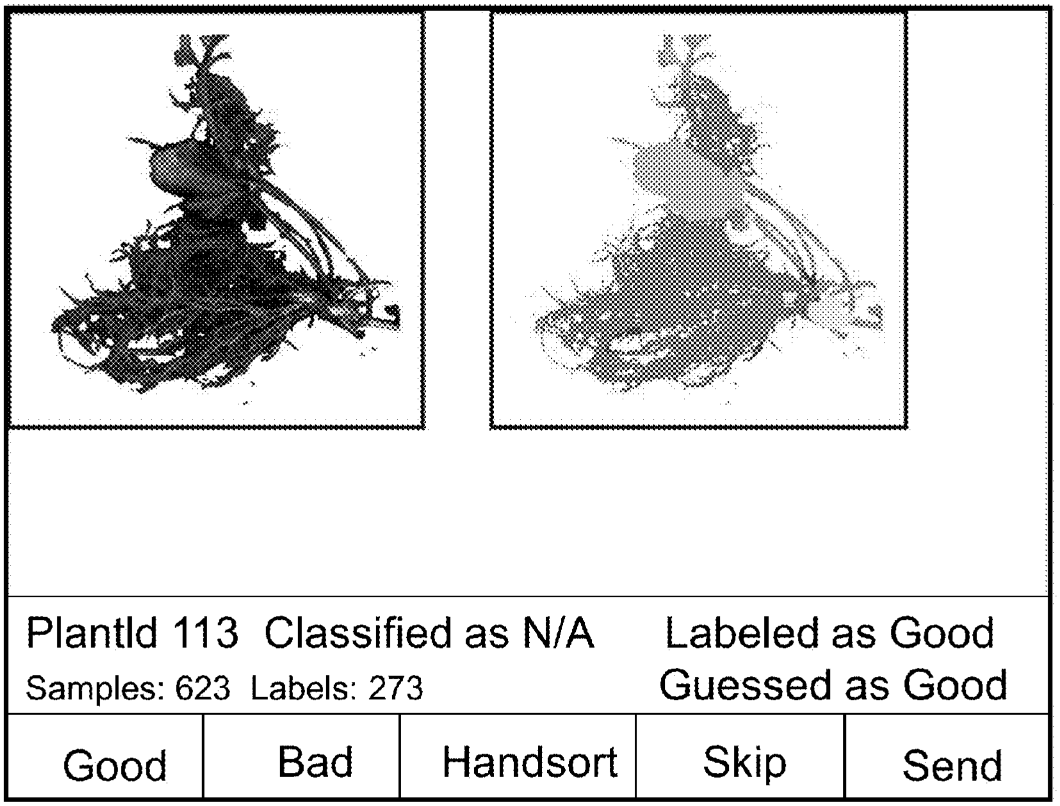
FIG. 12 is an image of the present invention showing an example training user interface for plant category assignment.

The second method uses unsorted plants that are provided to the system, capturing an image of each plant. These images are transmitted to a custom user interface that displays the image as well as the pixel classified image. This allows an operator to evaluate how to categorize a plant using the same information that the system will be using during training, which has the benefit of greater consistency. The operator then selects a category from the interface and the next image is displayed. An example interface is shown in FIG. 12.

After the required training images have been acquired, machine learning software (e.g., a SVM algorithm) is applied to build the associations of score vectors to plant categories. The final result is a model of parameters containing parameters used to determine the category of a pixel classified image.

Both of these training operations 32, 36 share some common algorithms to analyze, configure, and enhance accuracy. Randomization, class training distributions, penalty matrices, and exit criteria are all configurable with our implementation of the learning engine. These settings are independent of the actual machine learning engine software and enabled the software to attain accuracy equivalent to or beyond human levels. Additional features have been added to the training system to allow the user to predict expected accuracy and control error rates by using margins. These margins are computed by looking at the classifier confidence level, representing how certain it is that the item is of a certain category relative to the other categories. If the machine learning software is unsure about an answer for a pixel or a plant, the user can configure a specific margin (to ensure certainty). If the answer does not have enough margin, the answer will be marked ambiguous instead.

Another concept of the present invention is a method to make real-time adjustments to plant classification 37 during system operation (FIG. 2). While the system is operating, image and classification data is transmitted to a user interface such as the example in FIG. 12. A human operator is able to observe the classification results from the system, and if the result was not correct assign the image the correct category. The system automatically applies the corresponding machine learning algorithm used for the application to this new data, updating the model. This model can then be transmitted to the running system and new parameters loaded without requiring interruption of the system.

Another aspect of the present invention is Automated Feature Down-selection to Aid in Reaching Real-time Implementations (steps iv and vi of FIG. 4). The goal is to reduce the workload for step iv and step vi in FIG. 4. An application of this software may include a time constraint to classify an image, thereby restricting the number of features that can be calculated for the pixel and plant classification stages. Often a large number of features are designed and computed to maximize accuracy; however some features used for the machine learning system have redundant information. It is desired to find the minimum set of features needed to achieve the application specified accuracy and meet computational constraints during real-time operation. The present invention includes software that automatically down-selects which set of features are most important for sorting accuracy to satisfy this constraint. Two examples of operational algorithms are described below.

The first algorithm begins by utilizing all of the feature calculations that have been implemented and calculating a model of training parameters using the machine learning software. One feature calculation is then ignored and the training process is repeated, creating a new model for this feature combination. This process is repeated, each time ignoring a different feature calculation, until a model has been created for each combination. Once this step is complete the combination with the highest accuracy is chosen for the next cycle. Each cycle repeats these steps using the final combination from the previous cycle, with each cycle providing the optimal combination of that number of features. The overall accuracy can be graphed and examined to determine when the accuracy of this sort falls below acceptable levels. The model with the least number of features above required accuracy is chosen to be the real-time implementation.

The second algorithm has similar functionality as the first algorithm but the second algorithm starts with using only one feature at a time and increasing the number of features each cycle. The feature that results in highest accuracy is accepted permanently and the next cycle is started (looking for a second, third, fourth, etc. feature to use). This algorithm is much faster and is also successful at identifying which features to use for real-time implementation.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

We claim:

1. A method to recognize and classify a bare-root plant on a surface, comprising the steps of:

receiving from an imaging device a continuous output of raw image data of several bare-root plants passing through a field of view of the imaging device, wherein each of the several bare-root plants are arbitrarily disposed on the surface and positioned between the surface and the imaging device;

wherein the surface is horizontal and each of the several bare-root plants is lying flat on the surface; and wherein an orientation of each of the several bare-root plants on the surface is not uniform;

identifying a single bare-root plant in the raw image data by detecting and extracting a region in the raw image data corresponding to the single plant;

classifying each pixel of the bare-root plant identified in the raw image data to form a classified bare-root image based on trained parameters, comprising:

generating a vector of scores for each pixel of the classified bare-root image; and identifying a plurality of sub-parts of the bare-root plant based at least on the vector of scores and the trained parameters;

evaluating the classified bare-root image based on trained features to assign the bare-root plant to a configured category; and sorting the bare-root plant based on the assigned configured category as it moves from the field of view, using a sorting device in communication with a vision system.

2. The method according to claim 1, wherein the step of classifying comprises a step of detecting and extracting foreground objects to form a cropped image.

3. The method according to claim 2, wherein the step of detecting and extracting foreground objects comprises a step of creating the cropped image containing only the bare-root plant and minimal background.

4. The method according to claim 2, wherein the step of detecting and extracting objects comprises a step of color masking.

5. The method according to claim 4, wherein the step of color masking comprises a step of selecting a color of the surface to form a background color being maximally different compared to colors of the plurality of sub-parts of the bare-root plant to form foreground color.

6. The method according to claim 5, wherein the step of selecting the color of the surface to form the background color comprises the step of selecting the background color that is out of phase with the foreground color.

7. The method according to claim 6, wherein the step of selecting the color of the surface to form the background color further comprises a step of segregating the foreground color and the background color based on a hue threshold to create a mask.

8. The method according to claim 7, wherein the step of color masking further comprises a step of applying the mask to the raw image data to form the classified bare-root image, whereby only the foreground color is displayed.

9. The method according to claim 1, wherein the step of classifying each pixel of the bare-root plant identified in the raw image data to form the classified bare-root image further comprises a step of calculating the neighborhood mean and the variance for each pixel based on calculated features to form a portion of the vector of scores.

10. The method according to claim 9, wherein the step of classifying each pixel of the bare-root plant identified in the raw image data to form the classified bare-root image further comprises a step of down-selecting to reduce the number of calculated features.

11. The method according to claim 9, wherein the step of classifying each pixel of the bare-root plant identified in the raw image data to form the classified bare-root image further comprises a step of classifying each pixel of the bare-root plant based on the calculated features.

12. The method according to claim 1, wherein the step of generating the vector of scores comprises a step of machine learning to associate the vector of scores with particular sub-parts of the plurality of sub-parts of the bare-root plant.

13. The method according to claim 2, further comprising a step of masking of disconnected components of the cropped image to remove foreground pixels that are not part of the bare-root plant.

14. The method according to claim 1, wherein the step of evaluating the classified bare-root image based on trained features to assign the bare-root plant to a configured category comprises a step of calculating features of the plurality of sub-parts of the bare-root plant to generate a vector of scores for each bare-root plant image.

15. The method according to claim 14, wherein the step of calculating features of the plurality of sub-parts of the bare-root plant to generate a vector of scores for each bare-root plant image comprises a step of virtual cropping.

16. The method according to claim 14, wherein the step of evaluating the classified bare-root plant image based on trained features to assign the bare-root plant to a configured category further comprises a step of classifying the bare-root plant based on the vector of scores for each bare-root plant image.

17. The method according to claim 16, wherein the step of classifying the bare-root plant based on the vector of scores for each bare-root plant image comprises a step of machine learning to associate the vector of scores to assign the configured category to the bare-root plant.

18. The method according to claim 16, further comprising a step of calculating features for use in multiple plant detection based on the vector of scores.

19. The method according to claim 18, wherein the step of calculating features for use in multiple plant detection based on the vector of scores comprises a step of calculating vector of scores for multiple plant detection.

20. The method according to claim 19, wherein the step of calculating vector of scores for multiple plant detection further comprises a step of machine learning applied to the vector of scores for multiple plant detection to associate between a single bare-root plant and multiple bare-root plants.

21. The method according to claim 18, further comprising a step of detecting a single or multiple plants.

22. The method according to claim 12, wherein the step of machine learning comprises:

gathering examples of each category of bare-root plant;

acquiring an isolated image of each example;

establishing a training example based on foreground pixels from each isolated image; and creating a model for a classifier based on the training example to build associations of the vector of scores to the plurality of sub-parts of the bare-root plant.

23. The method according to claim 17, wherein the step of machine learning comprises:

gathering examples of each category of the bare-root plant;

acquiring an isolated image of each example;

establishing a training example based on foreground pixels from each isolated image; and creating a model for a classifier based on the training example to build associations of the vector of scores to plant categories.

24. The method according to claim 12, wherein the step of machine learning comprises:

gathering examples of images of complete bare-root plants;

processing each image with a super-pixel algorithm utilizing intensity and hue space segmentation;

labeling of the foreground pixels of each image for each sub-part of the complete bare-root plants to form a training example; and creating a model for a classifier based on the training example to build associations of the vector of scores to the plurality of sub-parts of the bare-root plant.

25. A method to recognize and classify a bare-root plant on a surface, comprising the steps of:

obtaining a raw image with an imaging device;

identifying a single bare-root plant in raw image by detecting and extracting a region in the raw image corresponding to the single bare-root plant, wherein the raw image contains several bare-root plants, wherein each of the several bare-root plants arbitrarily disposed on a surface and are positioned between the surface and the imaging device, wherein the surface is horizontal and each of the several bare-root plants is lying flat on the surface; and wherein an orientation of each of the several bare-root plants on the surface is not uniform;

detecting and extracting foreground objects to identify a plurality of sub-parts of the bare-root plant to form a cropped image;

calculating features for use in pixel classification based on the cropped image to classify each pixel of the cropped image as one sub-part of the plurality of sub-parts of the bare-root plant;

classifying pixels of the plurality of sub-parts of the bare-root plant to generate a vector of scores for each plant image;

calculating category features for use in plant classification; and classifying the bare-root plant based on the calculated category features into a configured category, sorting, the bare-root plant based on the configured category as it moves from the field of view, using a sorting device in communication with a vision system.

26. A method to recognize and classify a bare-root plant on a surface, comprising the steps of:

identifying a single bare-root plant in a raw image by detecting and extracting a region in the raw image corresponding to the single bare-root plant, wherein the raw image contains several bare-root plants, each of the several bare-root plants arbitrarily disposed on a surface; wherein the surface is horizontal and each of the several bare-root plants is lying flat on the surface; and wherein an orientation of each of the several bare-root plants on the surface is not uniform;

detecting and extracting foreground objects to identify a plurality of sub-parts of the bare-root plant to form a first cropped image;

masking disconnected components of the first cropped image to form a second cropped image, wherein the masking step comprises:

joining a first group of foreground pixels with an adjacent group of foreground pixels, and identifying the joined group of foreground pixels as disconnected components if a size of the joined group is less than a minimal value;

calculating features for use in pixel classification based on the second cropped image to classify each pixel of the cropped image as one sub-part of the plurality of sub-parts of the bare-root plant;

classifying pixels of the plurality of sub-parts of the bare-root plant to generate a vector of scores for each plant image;

calculating first category features for use in plant classification;

calculating second category features for use in multiple plant detection;

detecting a single plant or multiple plants; and classifying the bare-root plant based on the calculated first category features into a configured category, sorting, the bare-root plant based on the configured category as it moves from the field of view, using a sorting device in communication with a vision system.

27. The method of claim 1, wherein identifying a single bare-root plant in the raw image data further comprises:

comparing a count of foreground pixels along a first axis to a threshold count, wherein the threshold count is based on a minimum size of plant to be detected, wherein a plant part is detected in the foreground pixels if the count is higher than the threshold count; and comparing a second count of foreground pixels along a second axis to the threshold count, wherein the plant part is detected if the count is higher than the threshold count, thereby marking the plant part along the first axis and the second axis.

28. The method of claim 1, wherein identifying a single bare-root plant in the raw image data further comprises:

joining a first group of foreground pixels with an adjacent second set of foreground pixels if the first set and second set are connected; and discarding the joined group of foreground pixels if the joined group is below a threshold size, thereby removing dirt and debris from the raw image data.

* * * * *